(Model.)
W. T. FOLEY.
CHAIN.
No. 274,752. Patented Mar. 27, 1883.
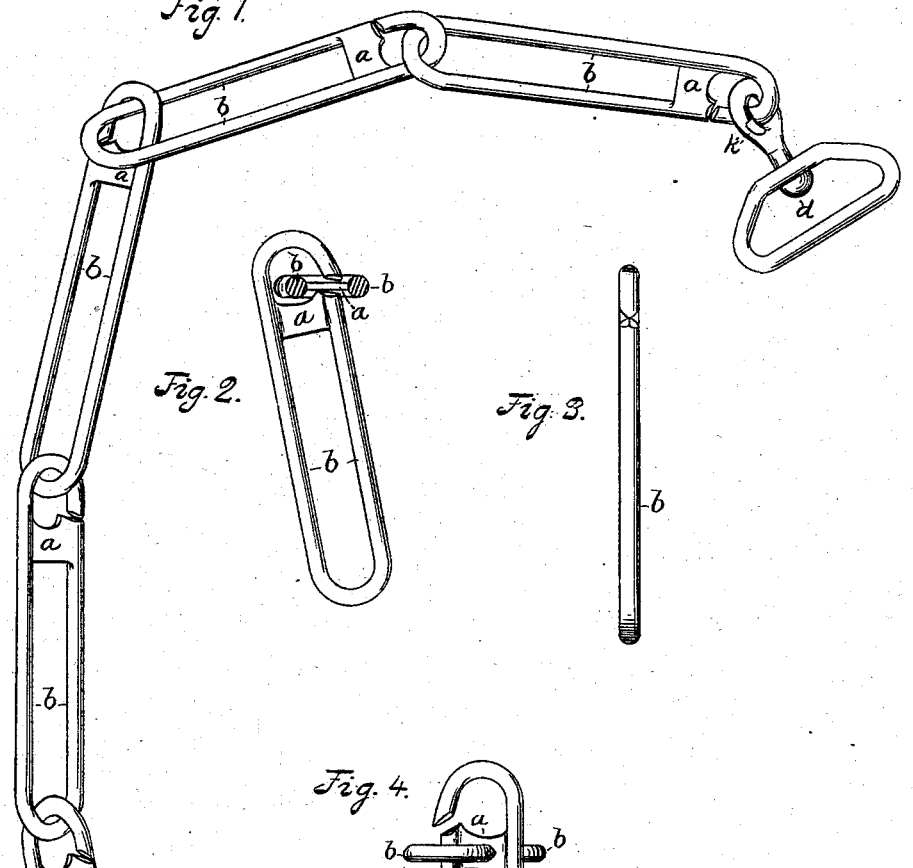
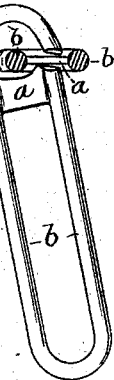
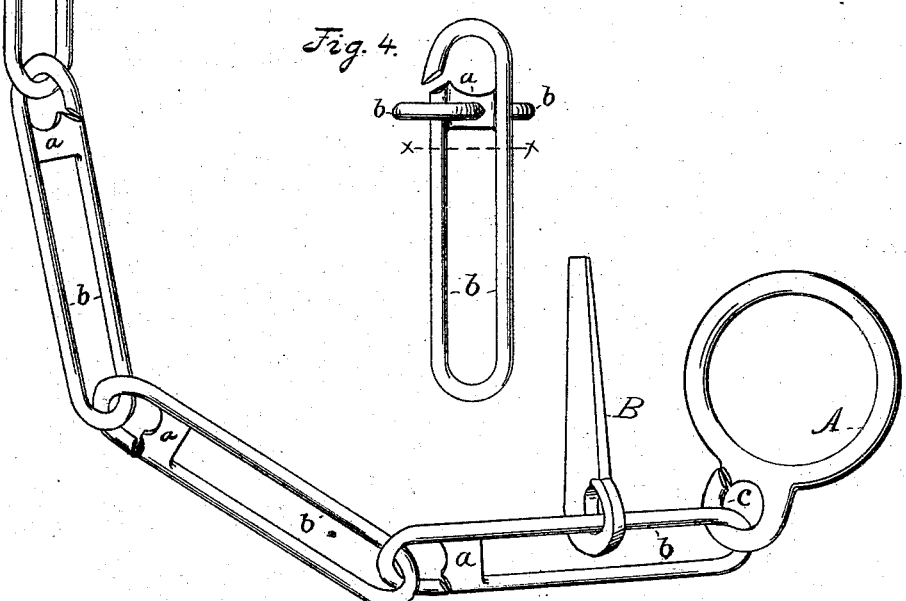
Witnesses.
John Edwards Jr.
Nettie Shepard.
Inventor.
William T. Foley.
By James Shepard.
atty

UNITED STATES PATENT OFFICE.

WILLIAM T. FOLEY, OF SOUTHINGTON, CONNECTICUT.

CHAIN.

SPECIFICATION forming part of Letters Patent No. 274,752, dated March 27, 1883.

Application filed March 20, 1882. (Model.)

*To all whom it may concern:*

Be it known that I, WILLIAM T. FOLEY, of Southington, in the county of Hartford and State of Connecticut, have invented certain new and useful Improvements in Chains, of which the following is a specification.

My invention relates to improvements in chains in which the links have a hook at one end, with a narrow opening, and a cross-bar adjacent thereto, made in the same plane with the hook, and are adapted to be permanently coupled to similar links to form the complete chain; and the objects of my improvements are to so form a cast chain that it can readily be put together and the links closed with as little bending as possible, and to so form the chain that it shall be very strong and durable. I attain these objects by the mechanism illustrated in the accompanying drawings, in which—

Figure 1 is a plan view of said chain as it appears when lying upon a flat surface. Fig. 2 is a side elevation of one link and a transverse section of another, as on line $x\,x$ of Fig. 4. Fig. 3 is an edge view of one link; and Fig. 4 is an elevation of two links, which, with Fig. 2, is designed to illustrate the manner of putting the links together.

The particular form of chain shown in the drawings is designed for a trap-chain; but I intend to apply the chain to other uses—as, for instance, halter-chains—in which case the links may be made a little shorter and heavier, and of course supplied with different trimmings. The links are oblong and their ends rounded, as shown. Upon one side of the link, near the rounded end, I form a slight opening the width of which is less than the diameter of the respective sides or body of the links, so that said body cannot pass through said opening. Near the opening in the link I form a cross-bar, $a$, for the purpose of strengthening the link and connecting the two sides of its body $b$. That end of the link which is upon one side of the cross-bar is substantially a hook, and the cross-bar lies in the same plane with said hook. This cross-bar I make thin enough to pass through the opening in the link, and consequently it is thinner than the body of the link $b$. The ends of the link-body at the opening are slightly beveled, so that when two of these openings are placed opposite each other, with one link at about right angles to the other, they may be hooked together, after which the cross-bar of one link may be slipped through the opening of the link hooked into it, as shown in Figs. 2 and 4, and then down to the opposite end, when the opening is closed to perfect the chain, as shown in Fig. 1. The cross-bar not only strengthens the link, but after the links are bent it prevents the links from ever coming into such a position as to bring together the parts of the link which have been closed. The body of the link at the end which projects but little from the cross-bar is so short as to require no strengthening except such as may be effected by making this portion of the link heavier than the rest, or, in other words, making the body of the link at this end of greater diameter than the rest. It should be noticed that the hook or open end of the link lies in the same plane with the rest and constitutes a part of the whole link. The thin cross-bar is not in the nature of an end for a link; but the links are completely hooked together first, after which one link is slipped over the cross-bar to bring the links into the desired position, and when the opening is closed the cross-bar prevents the links from being changed, end for end, in the chain.

The eye $c$ of the ring A is cast open, like the links, and is slipped upon the first link in the manner before described, and represented in Figs. 2 and 3, for two links. The wedge B may also be put on in the same way. The ring A is the end from which to work in forming a chain of these links. When the desired length of chain is formed the swivel $d$ is secured to the last link. The swivel-eye is made solid, but with notches $k$ for the purpose of thinning it a little at one point, so that the link may be hooked thereon.

It is well known that while malleable cast-iron will stand more or less bending it is oftentimes weakened by so doing, and for that reason the less it is bent in making an article the stronger that article will be. By my plan the chain-links have to be bent but little to close them. The same-shaped link would soon spread open and out of shape were it not for the strengthening cross-bar.

I claim as my invention—

1. The link for chains, having a hook at one end, with a narrow opening, and a cross-bar or diaphragm adjacent thereto, made thinner than the side bar and in the same plane with the hook, and adapted to be permanently coupled to similar links to form a chain, in the manner described, and for the purpose specified.

2. The link for chains, having a body which, beginning at the side of the link near one end, extends along one side, across one end, along the opposite side, and around the opposite end, to near the starting-point, where a narrow opening is left, thereby forming one end of the link into a hook, and having also a cross-bar near said opening, in the same plane with said hook, and forming the opposite end or part of the link into a closed or uncut eye, the complete link being adapted to be coupled to like links to form a chain by permanently securing the hook of one link within the uncut eye of the next adjoining link, substantially in the manner described, and for the purpose set forth.

WILLIAM T. FOLEY.

Witnesses:
MERIT N. WOODRUFF,
MARCUS H. HOLCOMB.